B. SHELDON.
POCKET TOOL OR IMPLEMENT.
APPLICATION FILED FEB. 11, 1911.
1,052,695.
Patented Feb. 11, 1913.
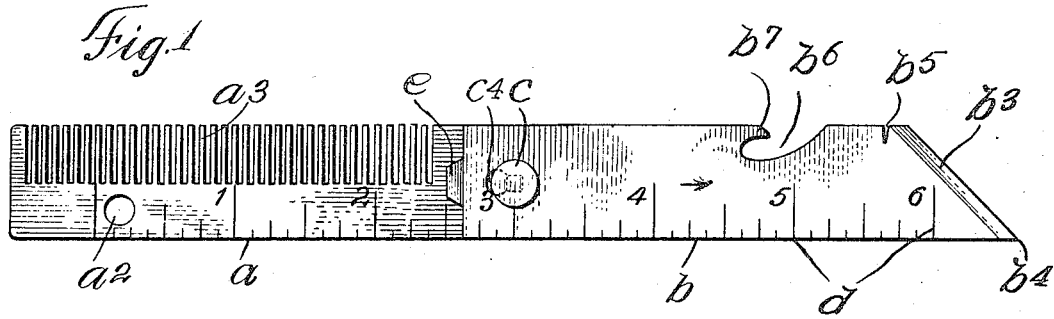
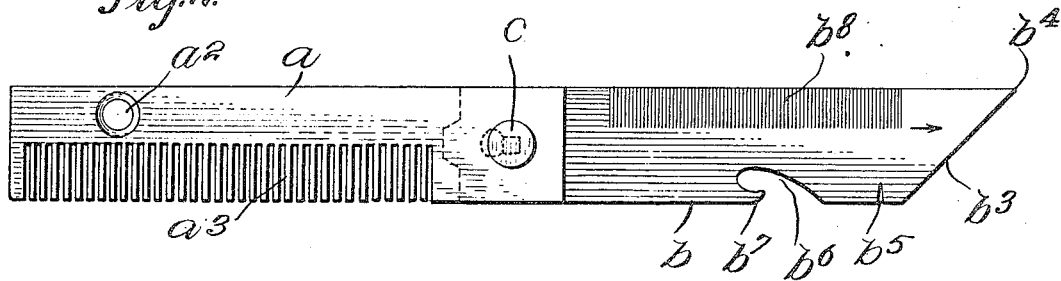
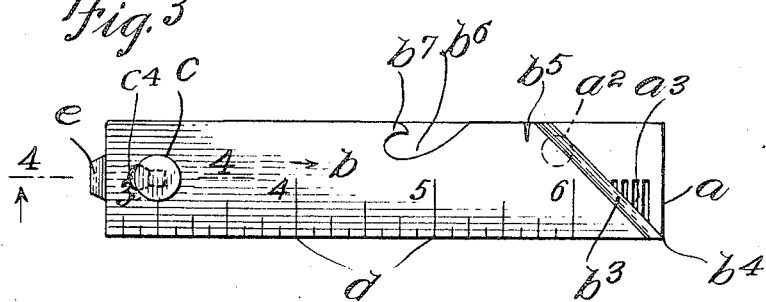
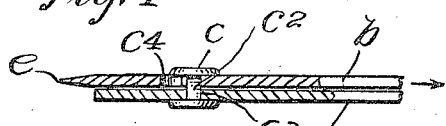
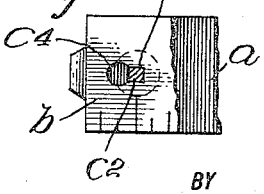
WITNESSES
E. G. Bromley.
F. J. At Lee
INVENTOR
BERNARD SHELDON.
BY Edgar Tate & Co.
ATTORNEYS

UNITED STATES PATENT OFFICE.

BERNARD SHELDON, OF KEYPORT, NEW JERSEY.

POCKET TOOL OR IMPLEMENT.

1,052,695.

Specification of Letters Patent. Patented Feb. 11, 1913.

Application filed February 11, 1911. Serial No. 607,968.

*To all whom it may concern:*

Be it known that I, BERNARD SHELDON, a citizen of the United States, and residing at Keyport, in the county of Monmouth and State of New Jersey, have invented certain new and useful Improvements in Pocket Tools or Implements, of which the following is a specification, such as will enable those skilled in the art to which it appertains to make and use the same.

This invention relates to pocket tools or implements and the object thereof is to provide an improved device of this class which is particularly designed for use as a device for opening cigar boxes and as a cigar cutter, but which may be used for a number of other purposes; a further object being to provide a pocket tool or implement of the class specified, consisting of two separate parts in the form of blades pivotally connected at one end and adapted to be folded together, which are also extended, when in use for any purpose; and with this and other objects in view, the invention consists in a device of the class specified, constructed as hereinafter described and claimed.

The invention is fully disclosed in the following specification of which the accompanying drawing forms a part, in which the separate parts of my improvement are designated by suitable reference characters in each of the views, and in which:—

Figure 1 is a side view of my improved pocket tool or implement and showing the parts thereof extended for use;—Fig. 2 a view similar to Fig. 1 and showing the opposite side of the tool or implement;—Fig. 3 a side view showing the separate parts of the tool or implement folded together;— Fig. 4 a partial section on the line 4—4 of Fig. 3, and;—Fig. 5 a plan view of the construction shown in Fig. 4 and partly in section.

In the practice of my invention I provide a tool or implement of the class specified, comprising two separate blade members $a$ and $b$, two ends of which are overlapped and pivoted together at $c$ and adapted to be extended as shown in Figs. 1 and 2, and to be folded together as shown in Fig. 3.

In making the pivotal connection at $c$ the pivot pin $c^2$ is made square in cross section and the blade member $a$ is provided with an aperture $c^3$ through which said pivot pin passes, and the blade member $b$ is provided with a circular aperture $c^4$ having an angular or square recess or extension $c^5$ adapted to receive the angular or square pivot pin $c^2$. With this construction, when the pivot pin $c^2$ is in the circular aperture $c^4$ the blade $b$ may be rotated on the blade $a$ and said blade $b$ may be moved longitudinally on the blade $a$ and when the blades are in the position shown in Figs. 1 to 5, inclusive, the said blades can not be rotated one upon another. The blade $a$ is also provided adjacent to its free end with a circular opening $a^2$ and the free end of the blade $b$ is beveled or inclined as shown at $b^3$ to form a point $b^4$ and the beveled or inclined portion $b^3$ is provided with a cutting edge, and the provision of the aperture $a^2$ in the blade $a$ and the cutting edge at $b^3$ adapt my improved implement to serve as a cigar cutter, the tip of the cigar being inserted into said aperture and the blade $b$ being swung into the position shown in Fig. 3 in order to accomplish this result.

It will be seen that the resistance of the cigar tip to the cutting edge will exert pressure longitudinally of the blade and therefore tend to force the parts into the locked position.

The blade $b$ is also provided in one edge thereof and adjacent to the inner end of the cutting edge $b^3$ with a narrow V-shaped recess $b^5$, and the construction at $b^3$ and $b^4$ forms a wedge-shaped point at $b^4$ for use in cutting around the lid of a cigar box and in prying open said lid, and the V-shaped recess $b^5$ serves as means for drawing the nail by which the cover of the box is held in a closed position.

That edge of the blade in which the recess is formed is also provided with an inwardly curved and extended recess $b^6$ forming a hook $b^7$ designed for use in lifting and removing the cover of a beer bottle or similar bottle, and the opposite edge of said blade member $b$ is provided with a nail file $b^8$.

One edge portion of the blade member $a$ is provided with or formed into a comb $a^3$, and one side of the tool or implement when the parts are extended as shown in Figs. 1 and 2, is provided with a six inch scale $d$ representing inches and fractions thereof.

From the foregoing description it will be seen that by means of my improved tool or implement, the binding around the lid or cover of a cigar box may be cut, the lid or cover pried open, and the nail which holds the lid or cover, withdrawn and the tip of a cigar may also be cut off and in addition thereto, my improved tool or implement may also be used as a pocket comb and as a nail file, and the cutting edge $b^3$ and point $b^4$ may also be used for other purposes.

One of the blades, the blade $b$ as shown in the drawing, is also provided with a screw-driver projection $e$ which may be used when the parts are folded together as shown in Fig. 3, and while I have described the separate blade members $a$ and $b$ as provided with certain features of construction, it will be understood that this arrangement of said features of construction may be reversed, if desired, and other changes in and modifications of the construction herein described may be made, within the scope of the appended claims, without departing from the spirit of my invention or sacrificing its advantages.

The method of connecting the blades $a$ and $b$ so that one of said blades is movable longitudinally of and also rotatable upon the other is designed for the purpose of providing means for locking said blades against rotation one upon the other when said blades are folded together as shown in Fig. 3 and also for the purpose of preventing the rotation of said blades one upon the other when extended as shown in Figs. 1 and 2, and all that is necessary to permit of the rotation of the blade $b$ on the blade $a$ is to slide said blade $b$ longitudinally of the blade $a$ which can easily be done by pressing the thumb or finger on the blade $b$ and at the same time applying pressure longitudinally of the same blade, it being understood that said blades are held in frictional contact by the pivot pin $c^2$ which is provided with large flat heads as shown; and by making the blades of the same length or approximately so the point $b^4$ of the diagonal cutting edge of one blade will be protected or covered by the end of the other blade when said blades are folded together as shown in Fig. 3 and this will prevent injury to the pocket or person.

Having fully described my invention, what I claim as new and desire to secure by Letters Patent, is:—

1. A tool or implement of the class described, comprising two plates of approximately the same length and pivotally connected at one end, said plates being provided at their pivotal point with means permitting of a longitudinal movement of the plates in respect to each other for locking them in a closed position, one of said plates being provided at its free end with a diagonal cutting edge which is protected or guarded by the end of the other plate when said plates are folded together, and the other plate being provided adjacent to its free end with a circular aperture, said aperture and said diagonal cutting edge operating as a cigar tip cutter and the resistance of the cigar tip to the cutting edge tending to force the blades toward locking position.

2. A tool or implement of the class described, comprising two blades of approximately the same length and pivotally connected at one end, the pivotal connection being such as to permit one of said blades to be moved longitudinally of the other and to be locked against rotation in open and closed positions, one of said blades being also provided at its free end with a diagonal cutting edge which is protected by the end of the other blade when said blades are folded together, said other blade being also provided adjacent to its free end with a circular aperture, and said aperture and the diagonal cutting edge of the other blade operating as a cigar tip cutter and the resistance of the cigar tip to the cutting edge tending to force said cutting blade longitudinally toward locking position.

In testimony that I claim the foregoing as my invention I have signed my name in presence of the subscribing witnesses this 9th day of February, 1911.

BERNARD SHELDON.

Witnesses:
C. E. MULREANY,
F. G. AT LEE.